(12) United States Patent
Traaserud

(10) Patent No.: US 11,142,968 B2
(45) Date of Patent: Oct. 12, 2021

(54) METHOD, AN APPARATUS AND A SYSTEM FOR ALIGNING PIPES COAXIALLY

(71) Applicant: Pipe Pilot AS, Sveio (NO)

(72) Inventor: Asbjørn Traaserud, Sveio (NO)

(73) Assignee: Pipe Pilot AS, Sveio (NO)

( * ) Notice: Subject to any disclaimer, the term of this patent is extended or adjusted under 35 U.S.C. 154(b) by 0 days.

(21) Appl. No.: 16/630,076

(22) PCT Filed: Jul. 9, 2018

(86) PCT No.: PCT/NO2018/050181
§ 371 (c)(1),
(2) Date: Jan. 10, 2020

(87) PCT Pub. No.: WO2019/013644
PCT Pub. Date: Jan. 17, 2019

(65) Prior Publication Data
US 2020/0149360 A1    May 14, 2020

(30) Foreign Application Priority Data

Jul. 13, 2017   (NO) .................................. 20171169

(51) Int. Cl.
| E21B 19/16 | (2006.01) |
| E21B 17/042 | (2006.01) |
| E21B 19/24 | (2006.01) |
| G01B 11/27 | (2006.01) |

(52) U.S. Cl.
CPC .......... *E21B 19/165* (2013.01); *E21B 17/042* (2013.01); *E21B 19/24* (2013.01); *G01B 11/272* (2013.01)

(58) Field of Classification Search
CPC ...... E21B 19/165; E21B 19/24; E21B 17/042; G01B 11/272
See application file for complete search history.

(56) References Cited

U.S. PATENT DOCUMENTS

| 4,747,454 A | 5/1988 | Perryman |
| 5,084,980 A * | 2/1992 | Skopec ................... E21B 25/16 33/286 |
| 8,550,174 B1 | 10/2013 | Orgeron et al. |
| 2004/0174163 A1* | 9/2004 | Rogers ................... E21B 19/165 324/228 |
| 2011/0103922 A1 | 5/2011 | Belik |
| 2012/0279782 A1 | 11/2012 | O-Reilly |

(Continued)

FOREIGN PATENT DOCUMENTS

| EP | 0471659 | 2/1992 |
| WO | 2013048260 | 4/2013 |

(Continued)

OTHER PUBLICATIONS

Norwegian Search Report for 20171169, dated Feb. 20, 2018.
(Continued)

*Primary Examiner* — Taras P Bemko
(74) *Attorney, Agent, or Firm* — Andrus Intellectual Property Law, LLP

(57) ABSTRACT

A method, an apparatus and a system are for aligning a movable first pipe coaxially with a substantially stationary second pipe to prepare a threaded end portion of the first pipe for engagement with a threaded end portion of the second pipe.

19 Claims, 10 Drawing Sheets

(56) References Cited

U.S. PATENT DOCUMENTS

| | | |
|---|---|---|
| 2013/0145590 A1 | 6/2013 | Brouwer et al. |
| 2013/0341036 A1 | 12/2013 | Flusche |
| 2014/0233804 A1* | 8/2014 | Gustavsson .......... E21B 47/002 |
| | | 382/103 |
| 2017/0362905 A1* | 12/2017 | Mailly ................ G06K 9/6269 |

FOREIGN PATENT DOCUMENTS

| | | |
|---|---|---|
| WO | 2014005187 | 1/2014 |
| WO | 2016106294 | 6/2016 |

OTHER PUBLICATIONS

International Search Report and the Written Opinion for PCT/NO2018/050181, dated Sep. 18, 2018.
Response to the Written Opinion for PCT/NO2018/050181, dated Apr. 15, 2019.
Written Opinion for PCT/NO2018/050181, dated May 31, 2019.
Response to the Written Opinion for PCT/NO2018/050181, dated Jul. 25, 2019.
International Preliminary Report on Patentability for PCT/NO2018/050181, dated Aug. 16, 2019.
Supplementary European Search Report for EP Application No. 18832909, completed Feb. 11, 2021.

* cited by examiner

METHOD, AN APPARATUS AND A SYSTEM FOR ALIGNING PIPES COAXIALLY

CROSS-REFERENCE TO RELATED APPLICATIONS

This application is the U.S. national stage application of International Application PCT/NO2018/050181, filed Jul. 9, 2018, which international application was published on Jan. 17, 2019, as International Publication WO 2019/013644 in the English language. The International Application claims priority of Norwegian Patent Application No. 20171169, filed Jul. 13, 2017. The international application and Norwegian application are both incorporated herein by reference, in entirety.

FIELD

The present invention relates to a method, for aligning pipes coaxially. More specifically the invention relates to a method, an apparatus and a system for aligning a movable first pipe coaxially with a substantially stationary second pipe to prepare a threaded end portion of the first pipe for engagement with a threaded end portion of the second pipe.

The pipes may typically, but not exclusively, be casing pipes or drill pipes used in the oil and gas is industry wherein a plurality of individual pipes, so-called pipe joints, form a pipe string.

BACKGROUND

A person skilled in the art will appreciate that a drill pipe is normally provided with relatively rough and robust threads, while a casing pipe is normally provided with fine threads being vulnerable to damages. The method according to the present invention is primarily directed towards a method for connecting joints or sections of casing pipes at a drill floor, but the method is also suitable for connecting drill pipes.

The individual joints of casing, typically having a length of about 12 meters, are secured to each other to make up a casing string being lowered into a well of an oil or a gas reservoir. When adding a new joint of casing to a string of casing, the string of casing will be supported at a rig floor by means of a wedge or spider having a set of slips that supports the weight of the casing string. Typically, a casing elevator provided with clamps is used to collect a new joint of casing to be secured to the casing string. The casing elevator normally engages a top portion of the new joint, preferably just beneath a box section of the joint so that a top portion of the elevator abuts against a shoulder of said box section. Such an elevator is normally connected to a top drive of the rig via bails providing a hinge connection between the elevator and the top drive. The bails are stiff rods typically with ends provided with eyes for receiving connection means arranged at the elevator and top drive, respectively. Thus, free hanging bails and the elevator, i.e. without carrying a new joint of casing, will due to gravity hang vertically down from the top drive. To be able to tilt the bails an angle with respect to a vertical axis to effect a horizontal adjustment of the elevator, a hydraulic cylinder is connected to a portion of the top drive and a portion of the bails between the eyes, as will be appreciated by a person skilled in the art. The actuation of the hydraulic cylinder is controlled manually, typically from a driller's cabin.

The elevator with the new joint of casing is lowered until it lands on, and is supported by, the string of casing. A casing gripper is then used to rotate the joint of casing so that a threaded pin portion of is the casing joint is rotated into engagement with a threaded box portion of the casing string.

A major challenge of such an operation is to make sure that the pin portion of the casing joint fully mates with the box portion of the casing string prior to rotating the joint of casing into engagement with the string of casing. By the term "fully mates" is meant that the joint of casing is sufficient coaxial with the string of casing to avoid any damages on the threads. The inventor has experienced that making a connection when there is a deviation of more than 1 to 1.5° between the longitudinal axis of the casing string and the casing joint, may cause serious damage to the threads of the pin/box connection. Depending on the damage, the threads may in some cases be repaired. However, such a repair is time consuming and therefore costly. In other cases, both the top pipe joint of the pipe string and the pipe joint to be connected thereto must be replaced.

A rig, especially an offshore rig, is vulnerable to movement due to for example wind and waves. Such a movement represents challenges for the driller and the casing operator to decide when the casing joint and the casing string are arranged sufficiently coaxially to commence the engagement operation, i.e. to activate rotation of the casing gripper. Oftentimes it is difficult, or even impossible, for an operator to decide whether the centre lines of the casing string and the casing joint are coaxially aligned.

There is therefore a need for a method and an apparatus that may provide a "diagnostic" of the relative position between the casing string and the casing joint to be connected to the casing string. Preferably, the method and the apparatus should provide information to the driller and the casing operator whether the connection is ready for commencement or not, i.e. go-information or no-go-information.

In accordance with the method, a relative position between the casing string and the casing joint to be connected to the casing string is measured by means of triangulation. Triangulation measurements may for example, but not exclusively, be provided by means of a laser emitting device by means of a so-called LIDAR (Light Detection and Ranging) technology.

Laser emitting devices have been used for a variety of purposes in the oil and gas industry.

Publication EP0471659 A1 discloses an apparatus and a method for aligning on a common axis at least two spaced-apart elongated members to a known angular relationship. The apparatus comprises: a laser for producing a beam of light; a reflector with a reference mark thereon; means for attaching the laser to a first elongated member with said laser directed along the common axis and with a first reference mark on a radius from the common axis to said laser; and means for attaching said reflector with the mark thereon to the second elongated member with said reflector perpendicular to the common axis and with a second reference mark on the radius from the common axis to said mark on said reflector. The apparatus and method are particularly suited for aligning the elements in directional core barrels used for determining the orientation of cores of rock cut from boreholes.

Publications WO2014/005187 A1 and US 2012/279782 A1 disclose a laser alignment device for a drill rig having an elongate drill rod, the laser alignment device including a head unit having at least a pair of laser emitting devices mounted independently of one another thereon, each of the laser devices movable in one plane only and oriented in substantially opposite directions to one another, an attachment means to attach the head unit to a drill rig and a length-adjustable assembly to adjust the separation distance between the head unit and the drill rod, wherein the alignment device is used to align at least the azimuth of the drill rod relative to survey marks.

Publication US 2013/341036 A1 discloses an apparatus for aligning a wellhead or BOP stack and a mast. The apparatus comprises: a rig carrier; a mast assembly pivotally mounted to said rig carrier, said mast assembly moveable between a lowered position and an upright position with respect to said rig carrier, said mast assembly extending over a back end of said rig carrier when raised to said upright position; a top drive mounted on said mast assembly which is constrained to move along a fixed axial path; and at least one sensor such as for example a laser or a sonar sensor, operable for aligning said fixed axial path with said wellhead or BOP stack for drilling operations.

Publication WO 2013/048260 A2 discloses a method for determining a stickup height of a pipe or the position of a pipe joint on the drill floor in order to accurately define the action point to where a pipe handling means, such as a roughneck, is to be applied.

U.S. Pat. No. 4,747,454 discloses a method for aligning a second conduit with a first conduit wherein the first conduit is substantially vertically positioned in a borehole so that an upper end of the first conduit extends upwardly from the bore hole. The second conduit has an upper end and a lower end, the method comprising the steps of: connecting a signal generating unit to the second conduit so as to be disposed in close proximity to the upper end thereof, said signal generating means adapted to produce a signal in the direction of the lower end of the second conduit representative of a vertical plumb line reference of the second conduit when the second conduit is substantially vertically disposed.

SUMMARY

The invention has for its object to remedy or to reduce at least one of the drawbacks of the prior art, or at least provide a useful alternative to prior art.

The object is achieved through features specified in the description below and in the claims that follow.

The invention is defined by the independent patent claim. The dependent claims define advantageous embodiments of the invention.

A first aspect of the invention relates to a method for aligning a movable first pipe coaxially with a substantially stationary second pipe to prepare a threaded end portion of the first pipe for engagement with a threaded end portion of the second pipe. The method comprises the steps of:

a) determining, by means of triangulation, a position of a centre line of the second pipe;

b) prior to bringing the threaded end portion of the first pipe in contact with the threaded end portion of the second pipe, determining, by means of triangulation, a position of a central end portion of the first pipe being closest to the second pipe;

c) calculating direction and amount of any horizontal deviation between the centre line of the second pipe and the central end portion of the first pipe facing the second pipe;

d) outputting a first guiding signal indicative of direction and amount of the horizontal deviation calculated in step c), e) moving the first pipe according to the first guiding signal; and then f) moving the threaded end portion of the first pipe to abut against the threaded end portion of the second pipe;

g) determining, by means of triangulation, a first pipe direction vector and a second pipe direction vector;

h) calculating direction and amount of any inclination of the first pipe direction vector with respect to the second pipe direction vector;

i) outputting a second guiding signal indicative of direction and amount of inclination calculated in step h);

j) adjusting the inclination of the first pipe according to the second guiding signal; and k) rotating the first pipe so that the threads of the first pipe engage with the threads of the second pipe.

In step a), the centre line may be determined by finding peripheral end-portions of a cross-section of the second pipe. By assuming that the pipe is circular, the position of the centre line may be calculated. Further, by assuming the second pipe having vertical orientation, only one horizontal measurement needs to be executed. In such a case with one horizontal measurement of the second pipe, a body of the second pipe is measured relatively close to a border area between the pipe body and the portion of the pipe provided with threads. By relatively close is meant for example 25 cm below the border area. However, in the event that the second pipe deviates from a vertical position, for example due to inclination of a floating rig, at least two distant positions of the second pipe may be measured to find a direction of the centre line of the second pipe.

In step b), the end portion of the first pipe may be determined in the same manner as for the "one measurement" case for the second pipe.

In steps a) to c) and g) to h), the triangulations and calculations are preferably determined and calculated by means of a computer.

Steps a) to e) may be repeated one or more times until the first guiding signal indicates that said central end portion of the first pipe is arranged substantially aligned with the centre line of the second pipe. Similarly, steps g) to j) may be repeated one or more times until the second guiding signal indicates that the first pipe direction vector is substantially coaxial with the second pipe direction vector.

In one embodiment, steps g) to k) are repeated at least until a portion of the threaded end portion of the first pipe has been rotated into engagement with the threaded end portion of the second pipe. This has the effect that any misalignment occurring during commencement of the engagement may be corrected.

In a manual operation controlled by an operator, at least one of the first guiding signal and the second guiding signal may be provided as visual and/or audible signals to an operator. In one embodiment, the signals may be presented as visual signals on at least one monitor such as for example a display device. Alternatively or additionally, the visual signals may be presented by means of coloured lights, such as for example red, yellow and green signals wherein red signal light may indicate "no-go", while a green signal may indicate "go" with respect to relative position of the first pipe with respect to the second pipe.

In an autonomous operation, i.e. an operation controlled by an automatic pipe handling apparatus such as a robot, the first guiding signal and the second guiding signal may be provided as input signals to the automatic pipe handling apparatus.

The triangulation measurements may be obtained by means of 3D sensor apparatus selected from the group comprising: laser scanning apparatus, acoustic scanning apparatus such as a sonar, radar apparatus, stereo camera, combined with triangulation algorithms, or a combination of two or more thereof.

In one embodiment, step a) and step b) may comprise using a laser scanning apparatus having an oscillating scanning pattern being substantially perpendicular to a longitudinal axis of the first pipe and the second pipe. Step g) may comprise using a laser scanning apparatus having a rotating scanning pattern wherein the scanning pattern is in a substantially vertical plane. Alternatively, step g) may comprise using an oscillating laser scanning apparatus having at least two scanning patterns being mutually distant and substantially perpendicular to a longitudinal axis of the second pipe.

In one embodiment, step a) and/or b) may comprise using a laser scanning apparatus having a rotating scanning pattern wherein the scanning pattern is in a substantially vertical plane.

As mentioned introductorily, a new joint of casing to be secured to the casing string supported at a rig floor, is typically collected from a storage area by means of a pipe handling apparatus or system comprising an elevator hanging from the top drive via bails.

To adjust an inclination of the first pipe according to the second guiding signal, as stated in step j) is of the method, it may be necessary to move the elevator carrying the first pipe a certain horizontal distance.

A horizontal movement of the elevator, and thus the inclination of the first pipe, is effected by tilting the bails. A tilting of the bails may typically be effected by means of the hydraulic cylinder connected to a portion of the bails and a portion of the top drive.

A person skilled in the art will appreciate that the tilting is possible in a two-dimensional plane only. The two-dimension tilting plane is an imaginary plane defined by a centre axis of the bails.

Prior to aligning the first pipe coaxially with the second pipe, the imaginary plane defined by the bails must be oriented with respect to the second pipe direction vector so that the imaginary plane is substantially perpendicular to the second pipe direction vector. If the bails are tilted by means of the hydraulic cylinders when the imaginary plane is not substantially perpendicular to the second pipe direction vector, then the first pipe direction vector would not be aligned with the second pipe direction vector. The imaginary plane defined by the bails is oriented by rotating the top drive a certain angle, as will be appreciated by the skilled person.

Experience shows that that in most situations, the imaginary plane defined by the bails does not have to be adjusted. However, it is sometimes necessary to adjust or reorient the imaginary plane to a substantially perpendicular position with respect to the second pipe direction vector so that the first pipe direction vector can be sufficiently aligned by tilting the bails by means of the hydraulic cylinders operatively connected thereto.

The inventor has surprisingly found that an electronic compass arranged on the elevator or on the top drive may provide information concerning a rotation angle of the elevator required for orienting the bails prior to or during tilting of the bails by means of the hydraulic cylinders. Further, the inventor has found that the hydraulic cylinders may be controlled automatically by means of a proportional valve known per ser and configured for receiving signals from a control unit.

In one embodiment, the method may comprise obtaining information regarding an initial orientation of an imaginary plane defined by bails connecting an elevator carrying the first pipe, the information provided by means of an electronic compass. In one embodiment, the method may comprise:

prior to step j) determining by means of a signal from an electronic compass, an orientation of an elevator carrying the first pipe, the elevator connected to a top drive via bails, each bail operatively connected to a hydraulic cylinder for adjusting an inclination of the bails;

comparing a current orientation with a desired orientation required for adjusting the inclination of the first pipe with respect to the second pipe; and if the desired orientation deviates from the current orientation, activating a rotation of the top drive is so that the desired orientation is achieved.

In one embodiment, step j) of adjusting the inclination of the first pipe according to the second guiding signal, may comprise activating the hydraulic cylinder for adjusting an inclination of bails in a pipe handling apparatus by means of a proportional hydraulic valve configured for receiving a control signal.

The control signal may be computer generated based on input from the second guiding signal.

Thus, it should be understood that the electronic compass arranged on the pipe handling apparatus, for example on the elevator or the top drive, provides information with regards to the orientation of the bails and the elevator. Once the signal from the compass provides information that the imaginary plane is correctly oriented with respect to the second pipe direction vector, instruction signals to the hydraulic proportional valve can be sent so that the hydraulic cylinder activates a desired tilting of the bails to align the movable first pipe coaxially with the stationary second pipe.

In one embodiment, the signals to the hydraulic proportional valve may be initiated manually by an operator, i.e. activation of the instruction signals is a manual operation.

Preferably, after an initial activation the instruction signals are computer generated. This has the effect that the desired inclination of the bails, and thus the alignment of the first pipe coaxially with the second pipe may be fully automatic once the compass gives the operator information that the imaginary plane is correctly oriented with respect to the second pipe direction vector.

In one embodiment the signals received from the electronic compass and the signals to the hydraulic proportional valve are sent/received continuously throughout the step of adjusting the inclination of the first pipe with respect to the second pipe.

In a second aspect of the invention there is provided an apparatus for aligning a movable first pipe coaxially with a substantially stationary second pipe to prepare a threaded end portion of the first pipe for engagement with a threaded end portion of the second pipe, the apparatus comprising:

a first triangulation device for determining a position of a centre line of the second pipe, the first triangulation device configured for sending a signal to a computer;

a second triangulation device for determining a position of a central end portion of the first pipe being closest to the second pipe, the second triangulation device configured for sending a signal to the computer;

the computer configured for calculating direction and amount of any horizontal deviation between the centre line of the second pipe and the central end portion of the first pipe facing the second pipe;

a signal transmitter for outputting a first guiding signal indicative of direction and amount of the horizontal deviation calculated by the computer; wherein the computer further configured for calculating a first pipe direction vector and a second pipe direction vector and providing a signal to the signal transmitter for outputting a second guiding signal indicative of direction and amount of inclination calculated by the computer. As mentioned above, the first triangulation device and the second triangulation device may be a 3D sensor apparatus selected from the group comprising: laser scanning apparatus, acoustic scanning apparatus, radar apparatus, stereo camera, combined with triangulation algorithms, or a combination of two or more thereof.

The first triangulation device may be a laser scanning apparatus oscillating in at least one plane or level.

The second triangulation device may be a laser scanning apparatus oscillating in more than one plane, wherein the planes are at different levels along a length of the first pipe. In one embodiment the second triangulation device is a rotating laser configured for rotating with respect to the length of the first pipe.

In an alternative embodiment, the first and the second triangulation device is a common triangultion device having a dual rotating or oscillating plane.

The signals may be presented to an operator by means of one of or a combination of a visible signal on a monitor, or by means of a signal-emitting device configured for giving a visual and/or audible signal.

The apparatus according to the invention may be used as a tool for measuring the length of the pipe string while tripping in hole. This is achieved by measuring by means of the triangulation devices a distance between specific parts of two succeeding pipes and add up a total length of the pipe string run in hole, as will be explained in the specific part of the description.

In a third aspect of the invention there is provided a system comprising the apparatus according to the second aspect of the invention, wherein the system comprises an electronic compass arranged on a pipe handling apparatus comprising an elevator and bails connecting the elevator to a top drive, wherein the compass is configured for sending a signal indicative of a position of an imaginary plane defined by a centreline of the bails.

In one embodiment the system further comprises a hydraulic proportional valve configured for activating hydraulic cylinders for affecting an inclination of the bails with respect to a vertical axis. In a preferred embodiment, the hydraulic proportional valve is operated by means of signals generated by the computer of the apparatus, the signals being based on the second guiding signal being indicative of direction and amount of inclination of the first pipe direction vector with respect to the second pipe direction vector.

From the above, it should be understood that the compass and the hydraulic proportional valve will make the method and the system almost fully automatic, i.e. semi-automatic. A fully automatic is method and system would require that the rotation of the top drive, i.e. activating a rotation of the top drive so that the desired orientation of the bails and thus the elevator, is also automatic. Such an automatization is particularly relevant for a pipe handling apparatus manufactured for use with the system according to the present invention. An existing pipe handling apparatus would require modification to be fully automatic for use with the system according to the invention. By controlling the orientation of the top drive manually, the only modification required is to connect the hydraulic proportional valve to the hydraulic valve controlling the inclination of the bails, and attach the electronic compass to a desired portion of the pipe handling apparatus.

In summary, the electronic compass is used to secure a correct orientation of the bails and the elevator prior to activating the hydraulic cylinders for aligning the first pipe directional vector coaxially with the second pipe direction vector, after which the threads of first pipe is rotated into engagement with the threads of the second pipe. The rotation is provided by means of a pipe rotating device known per se.

Thus, in one embodiment the method and system according to the invention can be easily implemented in existing pipe handling apparatuses substantially without modifications.

The method may further comprise measuring by means of triangulation a length of a pipe string while being tripped in hole. This has the effect that an exact length of the pipe string run in hole is known without having to measure the length manually.

BRIEF DESCRIPTION OF THE DRAWINGS

In the following is described an example of a preferred embodiment illustrated in the accompanying drawings, wherein.

DETAILED DESCRIPTION OF THE DRAWINGS

Figure 1:
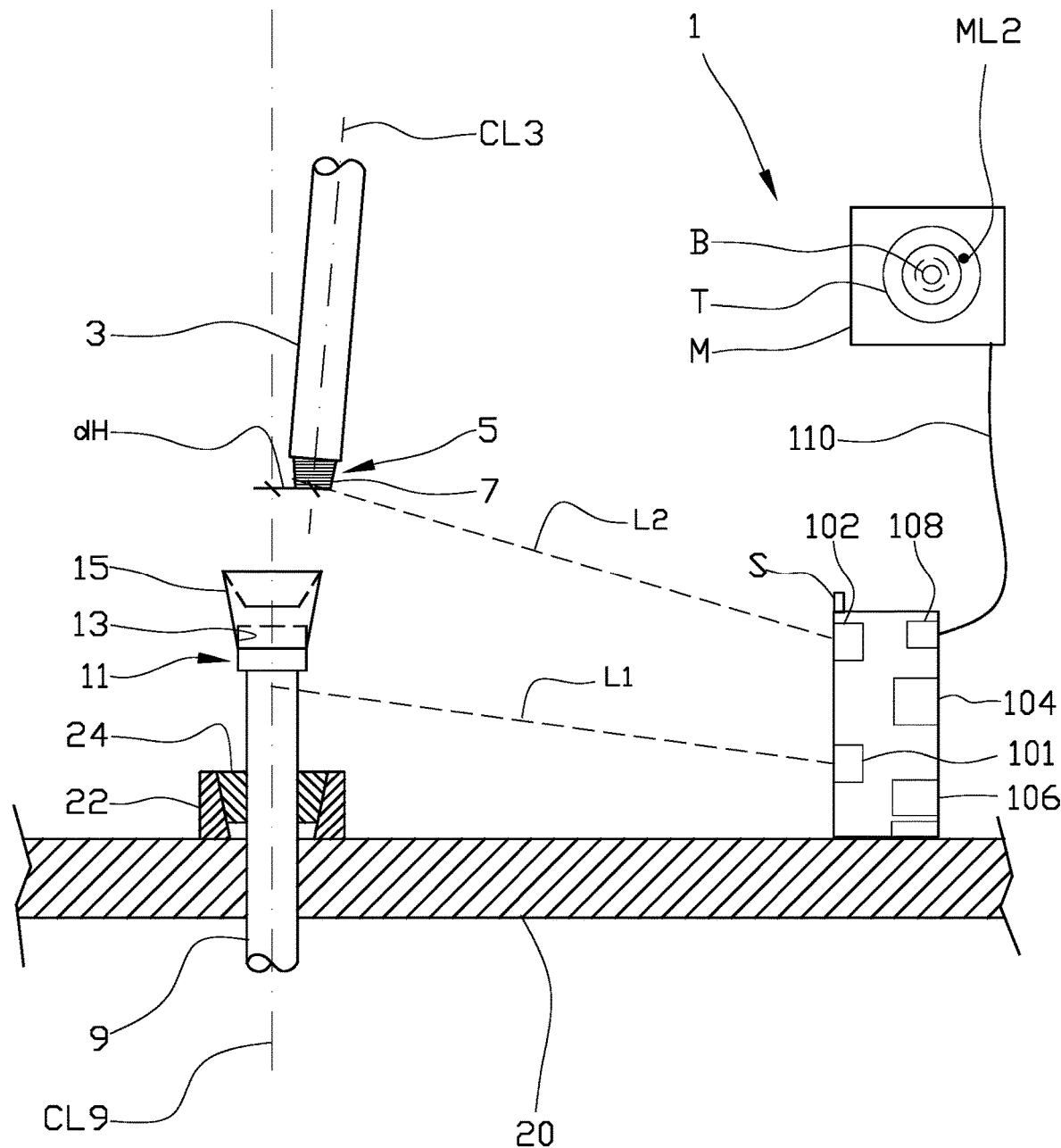
FIG. 1 shows a side elevation view of a top portion of casing string supported through a rig floor and a casing joint hanging above the casing string, wherein a laser apparatus is used to measure relative positions between the casing string and the casing joint, and a view of a first signal provided on a monitor indicating a relative position of the end portion of the casing joint with respect to the centre line of the casing string represented by a bull's eye of the target.

Positional specifications, such as over, under, upwards, downwards, upper, lower, right and left, refer to the positions that are shown in the figures.

The figures are principle drawings only. For illustrative reasons, the size ratios between some of the elements may be somewhat distorted.

Like or corresponding elements are indicated by the same reference numeral in the various figures, but, for the sake of exposition, some of the elements may be shown without reference numerals in some of the figures.

In FIGS. 1 to 5b, the reference numeral 1 indicates a triangulation apparatus for use in a method is for aligning a first pipe 3, here shown as a pipe joint 3, with a second pipe 9, here shown as a top portion of a pipe string 9. The pipe joint 3 and pipe string 9 may for example be casing pipes or drill pipes. In the following, the first pipe 3 is denoted a casing joint 3, while the second pipe is denoted a casing string 9.

A lower end portion of the casing joint 3 is provided with a pin 5 having external threads 7. A top portion of the casing string 9 (and a top portion, not shown, of the pipe joint 3) is provided with a box 11 having internal threads 13 mating with the external threads 7 of the pin 5.

The pipe joint 3 is carried by for example a casing elevator (not shown) provided with clamps, as will be appreciated by a person skilled in the art. The casing string 9 is supported at a rig floor 20 by means of a wedge 22 provided with slips 24 that supports the weight of the casing string 9.

In the embodiment shown, a top portion of the casing string 9 is provided with a detachable guiding collar 15, such as a manual stabbing guide, to provide a guiding means for guiding the pin 5 of the pipe joint 3 during lowering of the pipe joint 3 into abutment with the box 11 of the casing string 9. The pin 5 will hereinafter also be denoted pin portion 5. It should be noted that the guiding collar 15 is preferable, but not essential. When the pipe joint is a drill pipe stand to be connected to a drill string, such a guiding collar is normally not utilized.

The triangulation apparatus 1 comprises laser scanners 101, 102, a computer 104 with a software, power supply 106 and a transmitter 108 for transmitting signal to at least a monitor M for presenting a result of relative positions between the pipe joint 3 and the casing string 9, wherein the positions are determined by means of triangulation and calculated by means of the computer 104 with software. In the embodiment shown, the signal to the monitor M is transmitted via a cable 110. However, wireless signal transmission is also conceivable. The power supply 106 is connected to an internal or an external energy source.

A casing joint 3 to be connected on a top portion of a casing string 9, is typically moved from a storage area such as for example a so-called mouse hole (not shown) on a rig by means of an elevator (not shown), and near to the casing string 9, as shown in FIG. 1. The elevator may be operated manually or automatically by means of robotics.

In FIG. 1, the pipe or casing joint 3 hangs at a higher elevation than a top portion of the casing string 9 protruding above the rig floor 20, i.e. there is a vertical distance between the pin portion 5 of the pipe joint 3 and the box portion 11 of the casing string 9.

Prior to starting the operation, necessary information with regards to location of the apparatus 1 with respect to the portion of the casing string 9 protruding above the rig floor, and data filters and is tolerances, are entered into the computer 104 of the apparatus 1 in a manner known per se. By means of the data filters, only data acquired within a specific area will be used. The acquired data are distances and angles to the objects measured by the laser scanners 101, 102. Thus, data acquired from objects being outside of the specific area will be disregarded from triangulation calculations executed by the computer 104.

Figure 2A:
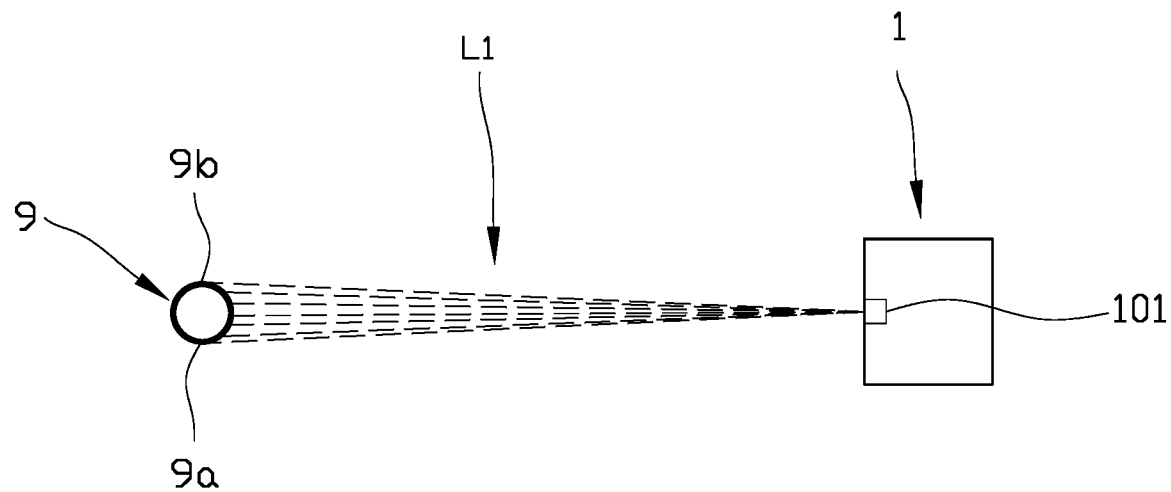
FIG. 2a shows a top view of a laser scanning path towards the casing string in FIG. 1.

When the information mentioned above is entered into the computer 104 and at least when the casing joint 3 is brought to the position shown in FIG. 1, the laser scanners 101, 102 of the triangulation apparatus 1 may be activated to start scanning a portion of the casing string 9 as indicated by the lower dotted line L1. This scanning is performed by the first laser 101. In the embodiment shown, a centre line CL9 of the casing string 9 is substantially vertical. In this operational step, it may therefore be sufficient to obtain data from only one level or elevation of the casing string 9. The first laser 101 may therefore oscillate in one level only as indicated in FIG. 2a, to obtain data for determining, by means of triangulation, calculations the position of the side portions 9a and 9b of the casing string 9 and thus provide data for calculating a position of the centre line CL9 of the casing string 9. However, in a situation where the casing string 9 is inclined, for example more than 5-10° with respect to a vertical direction, it may be desirable to determine the centre line CL9 of the casing string 9 in the same way as will be discussed below with regards to FIG. 4a and FIG. 4b wherein two or more mutually distant levels of the casing string 9 are measured.

Figure 2B:
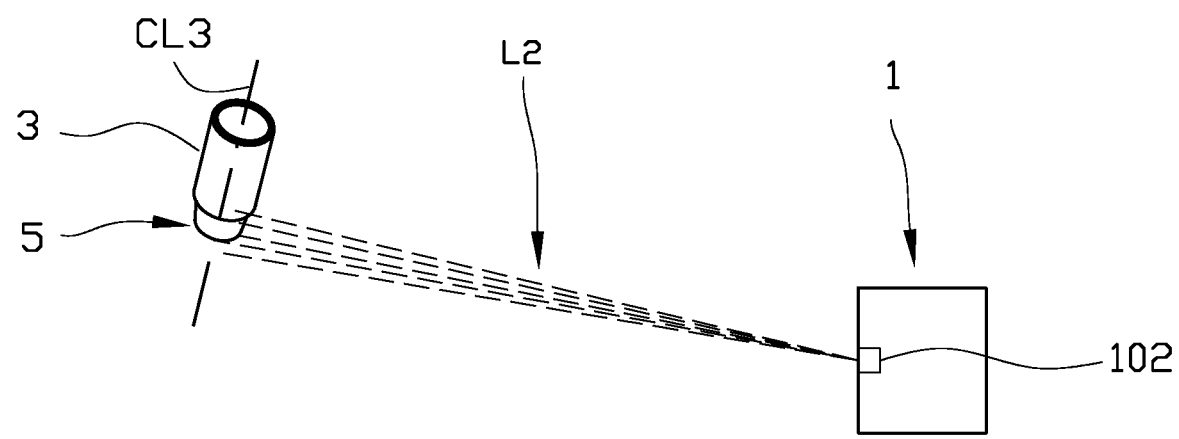
FIG. 2b shows a top view of a laser scanning path towards a lower portion of the casing joint in FIG. 1.

Thereafter, or alternatively simultaneously with the scanning of the casing string 9, a lower portion of the casing joint 3 is scanned in a similar way by means of a rotating or oscillating second laser 102, as indicated by the upper dotted line L2 shown in FIG. 1 and FIG. 2b. It should be noted that the dotted line L2 indicates the measurements that are used in calculating the position of the centre line CL3 of the lower end portion of pin portion 5 of the casing joint 3. It should also be noted that the second laser 102 is configured to cover an area extending below and above the lower end portion of the casing joint 3. This is advantageous in order to "find" the lower end portion of the pin portion 5 and thus be able to determine the position thereof by filtering away any data being above and below the lower end portion of the pin portion 5. Thus, the second laser 102 may typically be a laser rotating in a vertical plane or an oscillating laser configured for scanning in several "horizontal" levels, i.e. providing several horizontal scanlines being mutually distant.

By means of the software the computer 104 calculates any deviation dH between the centre line CL9 of the casing string 9 and the position of the lower end portion of the pin portion 5 of the casing joint 3.

A first guiding signal is sent from the computer 104 of the apparatus 1 to a monitor M indicating the deviation dH between the centre line CL9 of the casing string 9 and the position of the lower end portion of the casing joint 3. In FIG. 1, the first guiding signal is presented as a dot ML2 in a target T, wherein a bull's eye B on the target T represents the centre line CL9 of the casing string 9. The dot is ML2 in the target T provides information to an operator with respect both to a distance and an orientation of the position of the lower end portion of the casing joint 3 with respect to the target T, i.e. the centre line CL9 of the casing string 9. Thus, in a manual operation, the operator receives visual information for moving the casing joint 3 towards a target position. During any movement of the casing joint 3, the measurement and calculation of at least the position of the lower end portion of the casing joint 3 continues either continually or at certain time intervals such as for example, but not limited to, one measurement every second.

Figure 3:
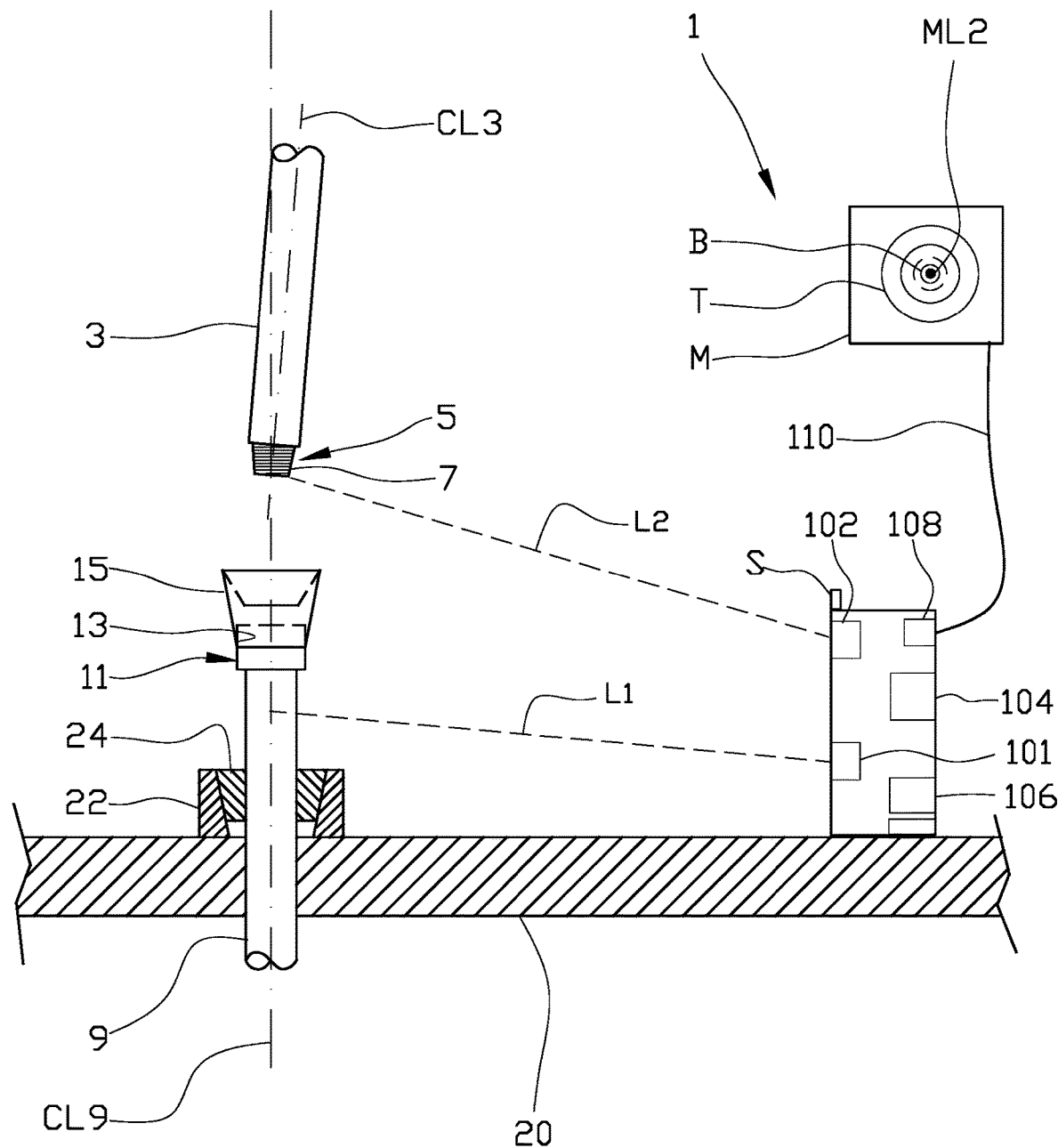
FIG. 3 shows the same as FIG. 1, but after an end portion of the casing joint has been moved substantially into alignment with a centre line of the casing string.

The movement of the casing joint 3 typically continues until the first guiding signal ML2 indicates that the central lower end portion of the casing joint 3 substantially crosses the centre line CL9 of the casing string 9, i.e. that the dot ML2 is at least within an outer portion (shown by a dotted line) of the bull's eye B in the target T. This is indicated in FIG. 3 wherein dH indicated in FIG. 1 is close to zero. Due to the guiding collar 15, the dH indicated in FIG. 1 does not have to be zero. It is adequate that dH is sufficiently small to allow the pin 5 of the casing joint 3 to be guided by the collar 15 into correct position with respect to the box section 11 of the casing string 9 during lowering of the casing joint 3 into abutment with the box section 11, as shown in FIG. 4.

A drill pipe string is normally not provided with a separate guiding collar 15 of the type shown in FIGS. 1 to 5b. However, a person skilled in the art will appreciate that a box portion of a drill pipe string has a "wedge" form for receiving a pin portion of a drill pipe stem.

The alignment discussed above may be regarded as a "course" alignment. Thus, the course alignment is represented by steps a) to f) above.

However, in order to avoid any damage to the threads 7 of the pin 5 and the threads 13 of the box 11, the casing joint 3 should be fully aligned with the casing string 9, i.e. the casing joint 3 must be arranged coaxially with the casing string 9. By the term fully aligned is meant sufficiently aligned to avoid any "shearing" or other serious damages to the threads 7, 13 when rotation of the casing joint 3 commences. The inventor has found that a deviation of up to about 1.5° between the centre line CL3 of the casing joint 3 and the centre line CL9 of the casing string 9, is acceptable. For a casing joint 3 having an overall length of 11 meters, a distant end portion (not shown) of the casing joint 3 may deviate up to about 20 cm from the centre line CL9 of the casing string 9 to be sufficiently aligned.

A person skilled in the art will appreciate that the maximum acceptable deviation depends on the type of threads of the pipes to be screwed together. Other pipes than casing, such as for example drill pipes normally having much coarser threads than those of casing pipes, may be connected while having a larger deviation than that for casing pipes discussed above.

Figure 4A:
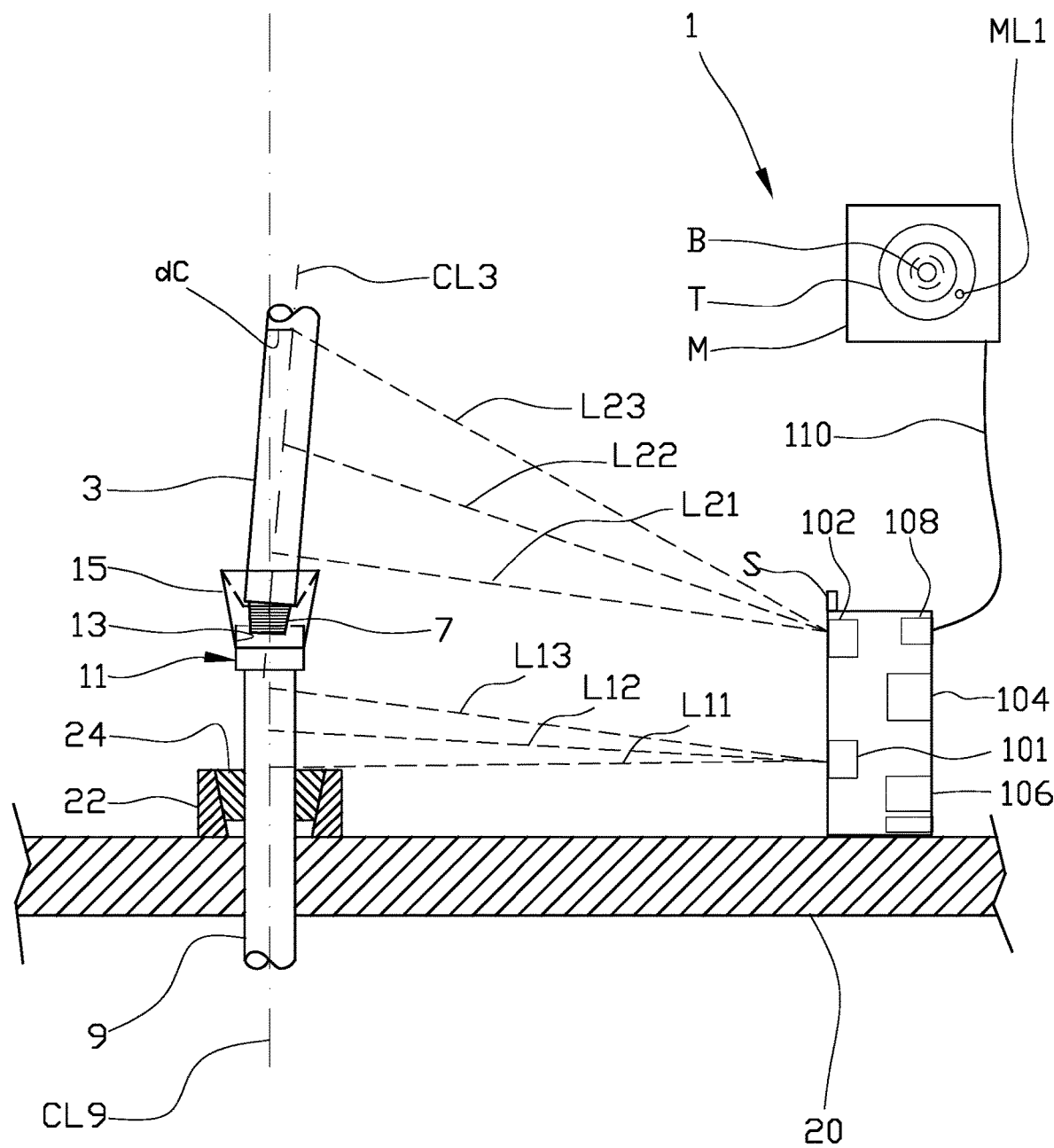
FIG. 4a shows the casing joint after being lowered into contact with the casing string, wherein the laser scanning apparatus is used to determine the direction vector of the upper portion of the piping string and the direction vector of the casing joint, and a view of a second signal provided on the monitor indicating a relative position of the inclination of the casing joint with respect to the centre line of the casing string represented by a bull's eye of the target.
Figure 4B:
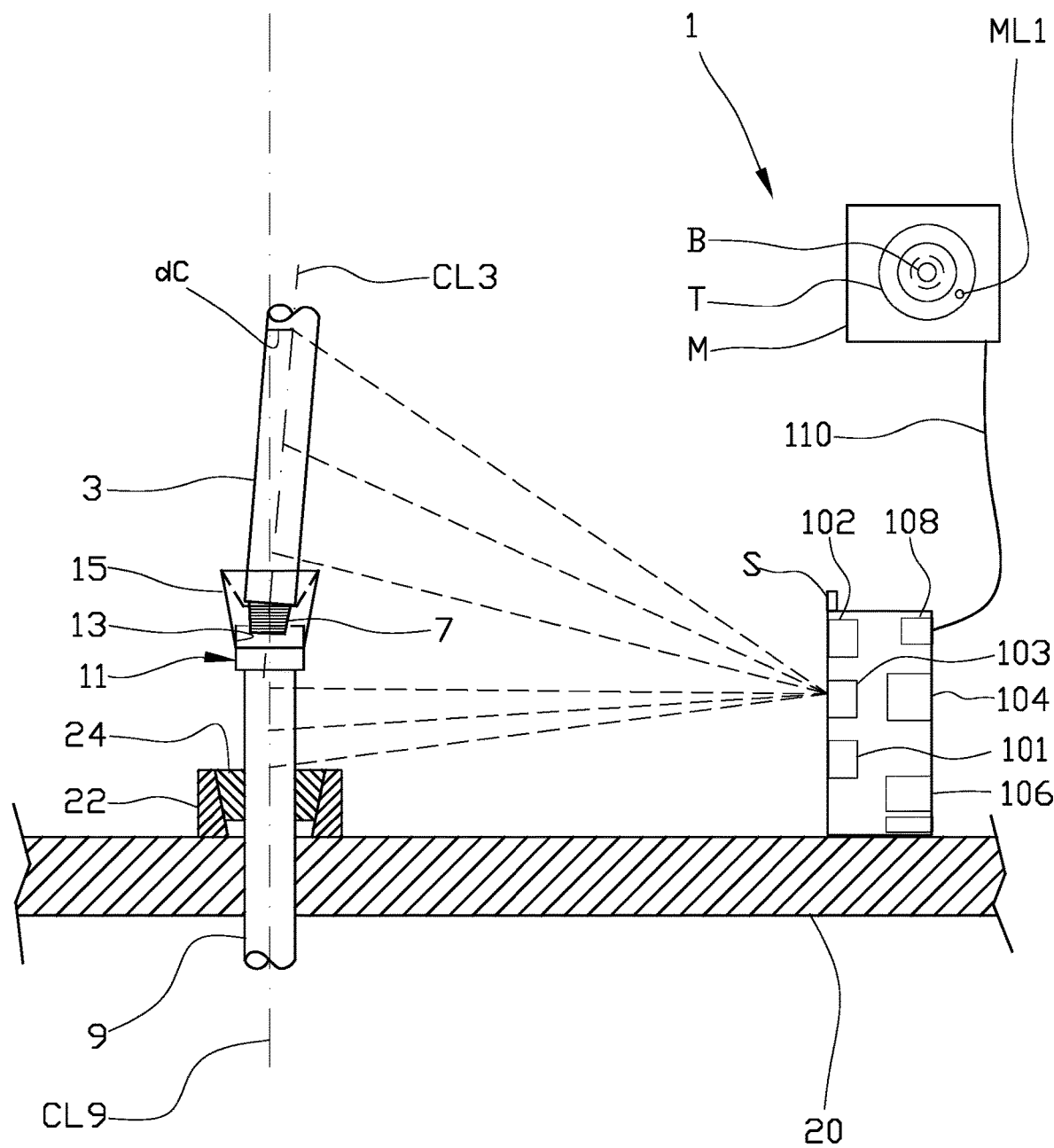
FIG. 4b shows an alternative to the embodiment shown in FIG. 4a, wherein the direction vector of the upper portion of the piping string and the direction vector of the casing joint is determined by a means of a third laser scanning apparatus.

FIG. 4a and FIG. 4b illustrates two alternative ways of finding the deviation dC between the centre line CL3 of the casing joint 3 and the centre line CL9 of the casing string 9.

In FIG. 4a, a direction vector of a portion of the casing string 9 protruding from the rig floor 20 is determined by scanning at least two (three shown in FIG. 4a) mutually distant portions L11, L12, L13 of the casing string 9. This scanning is performed by means of the first laser scanning apparatus 101. Similarly, the direction vector of the casing joint 3 is determined by scanning at least two (three shown in FIG. 4a) mutually distant portions L21, L22, L23 of the casing joint 3. This scanning is performed by means of the second laser scanning apparatus 102. Based on the triangulation data acquired by the laser scanning apparatuses 101, 102, the direction vectors for the casing joint 3 and casing string 9, respectively, are calculated. For simplicity, the direction vectors for the casing joint 3 and the casing string 9 are denoted CL3 and CL9, respectively.

The purpose of scanning at least two mutually distant portions of each of the casing joint 3 and the casing string 9, is to take into account any movement of for example a floating rig being subjected to waves. Such a movement may bring the casing string 9 out of an exact vertical position.

The measurements of the mutually distant portions L21-L23 and L11-L13 of the casing joint 3 and casing string 9, respectively, are, in the embodiment shown in FIG. 4a, obtained by scanning first one portion of the pipe substantially horizontally and then scanning at least one other portion of the pipe being mutually distant from the first portion along a longitudinal axis of the pipe.

By means of the software, the computer 104 calculates any deviation dC between the centre line CL9 of the casing string 9 and the position of uppermost scanning portion indicated by the dotted line L23 of the casing joint 3.

In the alternative embodiment shown in FIG. 4b, the at least two mutually distant portions described above may be obtained by means of a single laser scanning apparatus 103 having a dual rotating or oscillating plane.

Figure 5A:
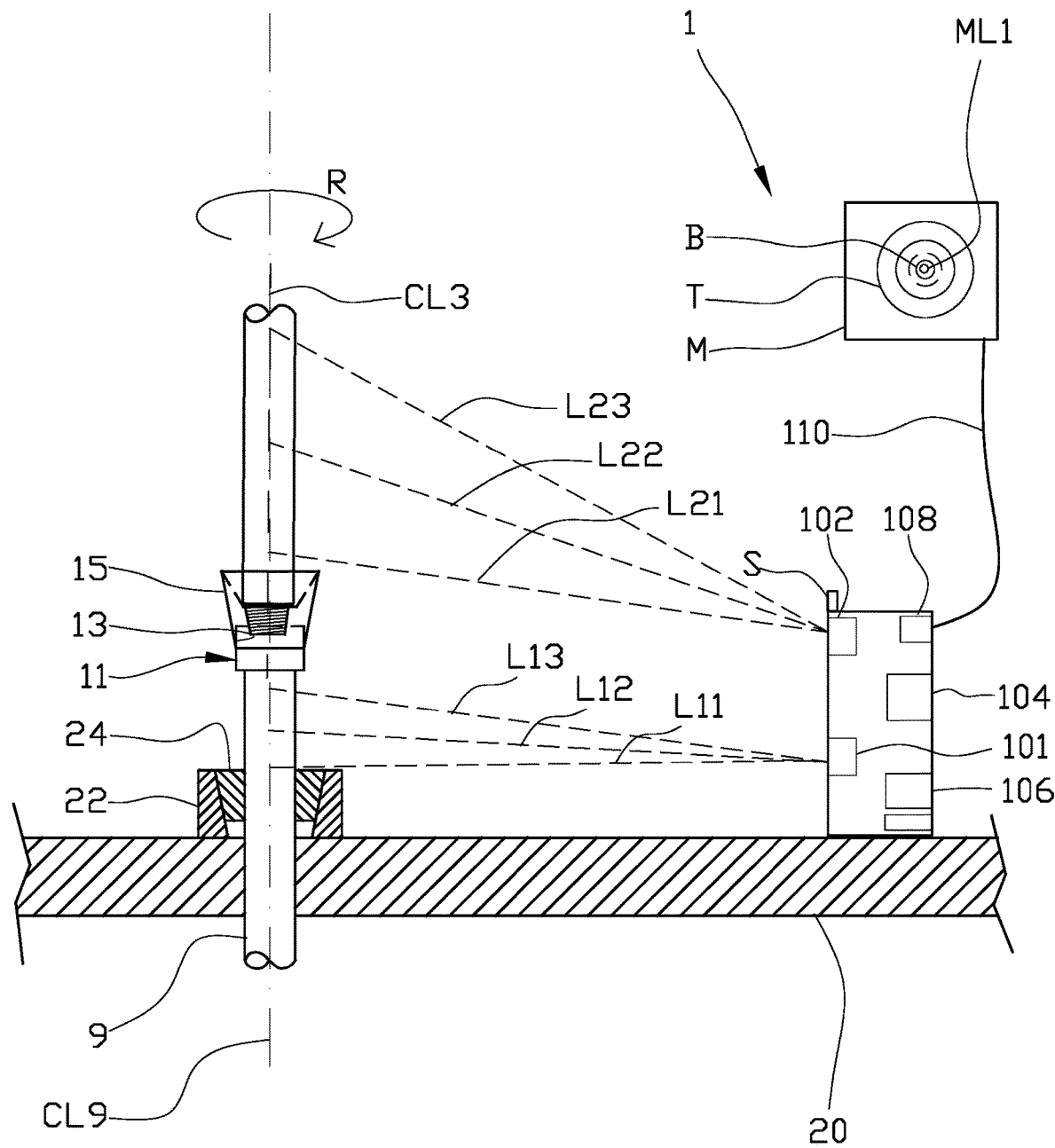
FIG. 5a shows the same as FIG. 4a, but after the centre line of the casing joint has been moved substantially into alignment with a centre line of the casing string, and rotation of the casing joint into engagement with the casing string has commenced.
Figure 5B:
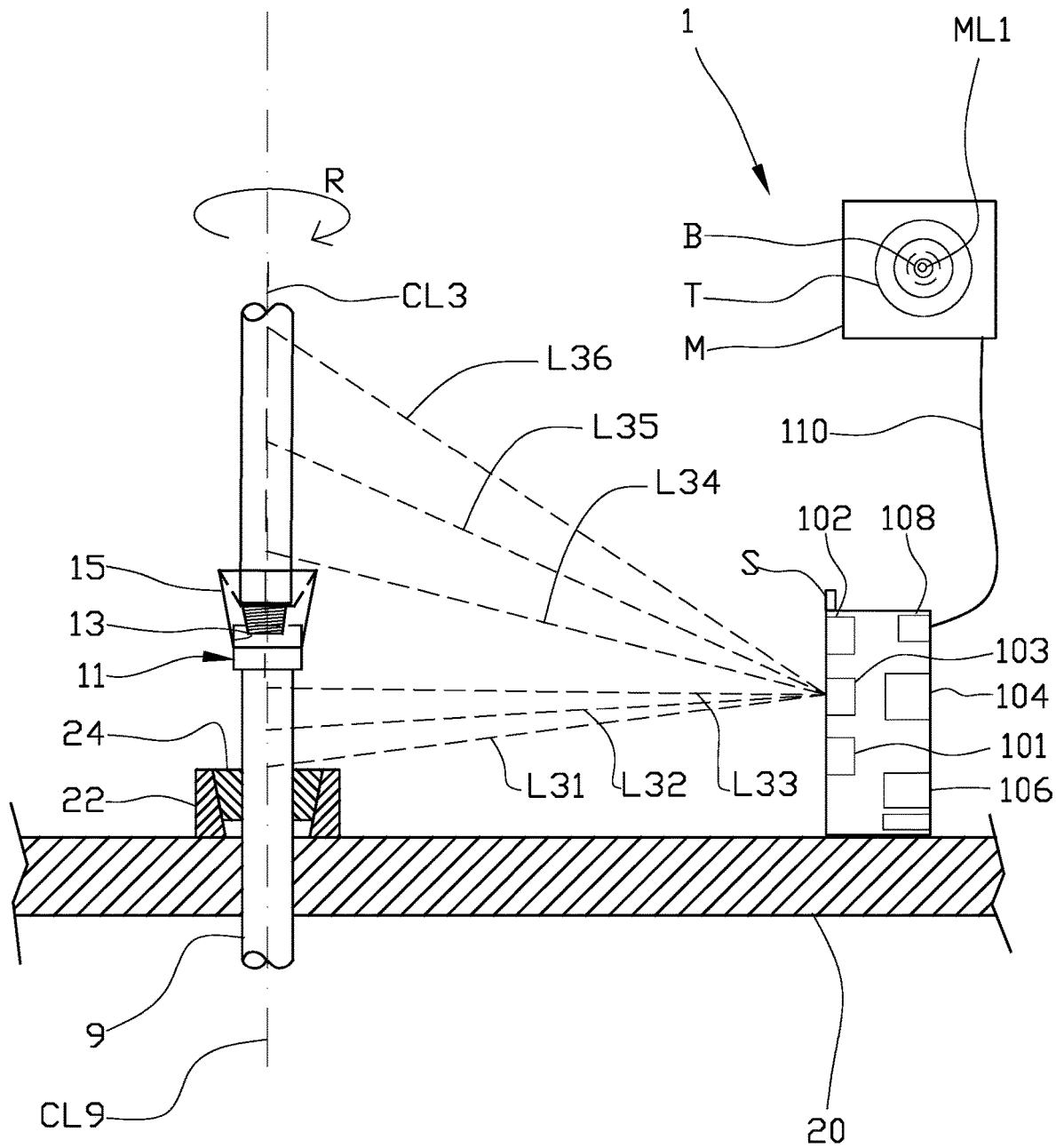
FIG. 5b shows an alternative to the embodiment shown in FIG. 5a, wherein the direction vector of the upper portion of the piping string and the direction vector of the casing joint is determined by means of a third laser scanning apparatus.
Figure 7:
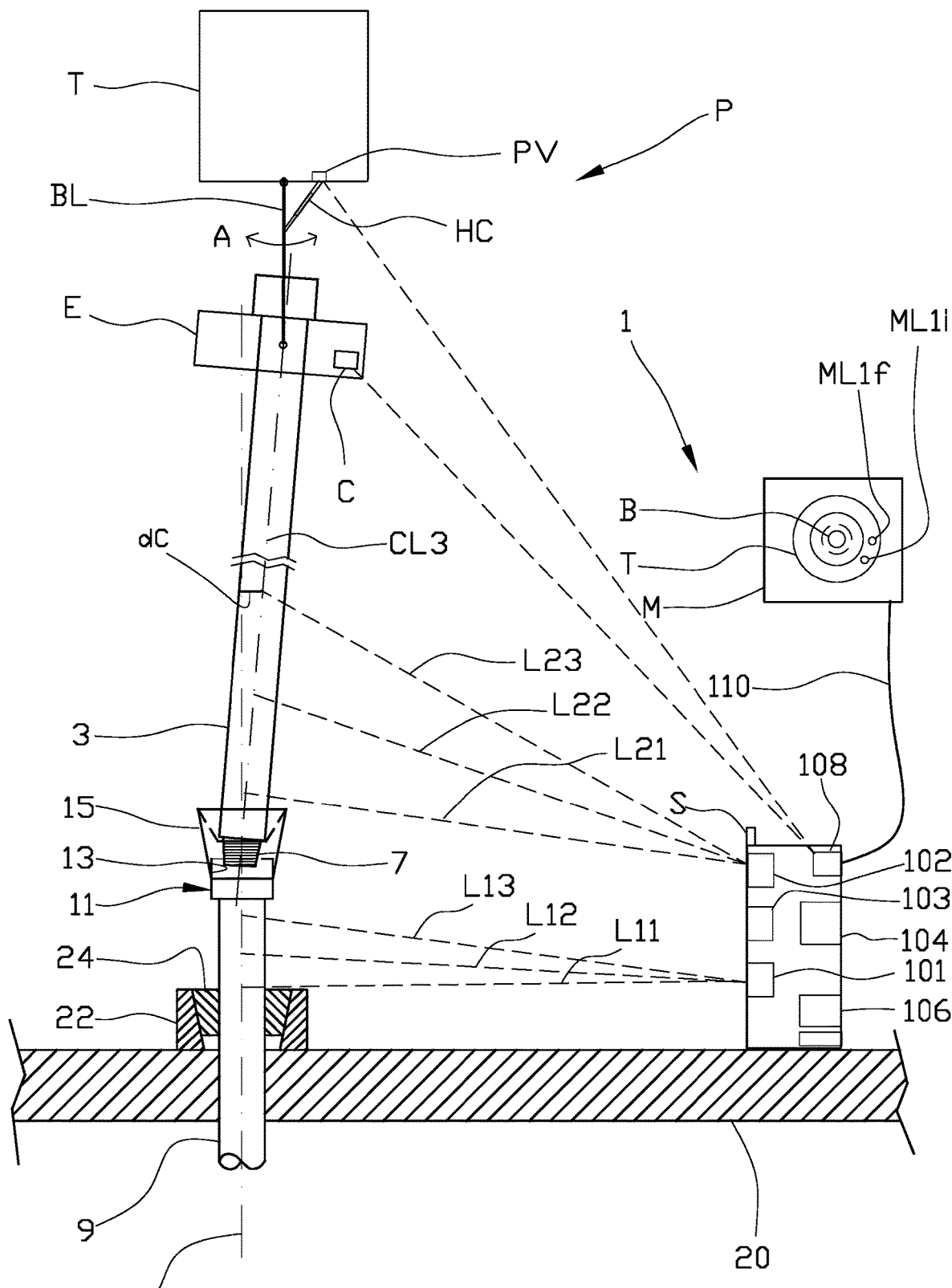
FIG. 7 is based on FIG. 4a, but where an elevator is provided with an electronic compass and a proportional hydraulic valve wherein the valve is configured for controlling a cylinder for adjusting an inclination of the bails.

The third laser scanning apparatus 103 (which is shown in FIGS. 4b, 5b and 7 only) is configured for rotating or oscillating in a vertical plane, while at the same time rotating or preferably oscillating in a "horizontal" plane in a similar way as shown in FIG. 2a.

From measurements obtained by the third laser scanning apparatus 103, the centre line CL9 of the casing string 9 is calculated from data obtained from the mutually distant portions L31-L33 (corresponding to the mutually distant portions L11-L13 shown in FIG. 4a), while the centre line CL3 of the casing joint 3 is calculated from data obtained from mutually distant portions L34-L36 (corresponding to the mutually distant portions L21-L23 shown in FIG. 4a).

By means of the software, the computer 104 calculates any deviation dC between the centre line CL9 of the casing string 9 and the position of uppermost scanning portion indicated by the dotted line L36 of the casing joint 3.

Independent of which one of the embodiments shown in FIGS. 4a and 4b that are utilized, a second guiding signal is sent from the apparatus 1 to the monitor M indicating the deviation dC between the centre line CL9 of the casing string 9 and the casing joint 3. Thus, the second guiding signal provides information about direction and magnitude of the inclination of the casing joint 3 with respect to the casing string 9. In FIG. 4a and FIG. 4b, the second guiding signal is presented as a dot ML1 in the target T wherein a bull's eye B on the target T represents the centre line CL9 of the casing string 9. In the example shown in FIG. 4a, or in the alternative embodiment shown in FIG. 4b, the dot ML1 on the monitor M indicates that the casing joint 3 is inclined to the right and a bit out of the drawing plane.

Preferably, the second signal ML1 is visually different from the first signal ML2, for example by means of a different colour or pattern. By presenting two visually distinguishable signals ML1 and ML2, both signals may be presented simultaneously. Such a simultaneous presentation may be particularly desired if the top portion of the casing string 9 is not provided with the collar 15. Without the collar 15, the lower portion of the casing joint 3, i.e. the pin 5, may move horizontally with respect to the box 11 of the casing string 9 before the engagement of the threads 7, 13 has commenced.

Based on the second signal ML1, the operator may move the casing joint 3 until the second signal ML1 is within the inner portion bull's eye B, i.e. the inner circle of the target T. Thus, the triangulation measurements continue either "continually" or at certain time intervals, such as for example each second, at least until the direction vector CL3 of the casing joint 3 is aligned with the direction vector CL9 of the casing string 9.

The alignment discussed above may be regarded as a "fine" alignment.

Once the direction vector CL3 of the casing joint 3 is aligned with the direction vector CL9 of the casing string 9, rotation R of the casing joint 3 with respect to the casing string 9 may commence so that the threads 7 of the pin 5 correctly engage with the threads 13 of the box 11. This is shown in FIG. 5a and in FIG. 5b showing an alternative embodiment of FIG. 5a.

In FIGS. 1 to 5b, the apparatus 1 is provided with a signal-emitting device S configured for giving a visual and/or audible signal to the operator. The signal-emitting device S may be a "go"/"no-go"-signal based at least on the second signal ML1 sent from the apparatus 1. For example: during the coarse alignment shown in FIG. 1 to 4a or 4b, the signal-emitting device S may emit a red light indicating "no-go" with respect to starting rotation of the casing joint 3 into engagement with the casing string 9. Such a red light will be emitted until the direction vector CL3 of the casing joint 3 is fully aligned with the direction vector CL9 of the casing string 9, i.e. until the second signal ML1 is within the inner portion of the bull's eye B of the target T. When the second signal ML1 is within the inner portion of the bull's eye B of the target T, the light emitted from the signal-emitting device S is will change to green light indicating "go" with respect to starting rotation R of the casing joint 3. In one embodiment, an audible signal may be issued simultaneously with the green light. This example is one way of providing signals to an operator in addition to the information provided by the target T. It should be clear that other alternatives with respect to light and/or audible signal may be issued by the signal-emitting device S to provide any "go" or "no-go" signals to the operator.

In an alternative to an operation manually controlled by an operator, the signals ML2 shown in FIGS. 1-3 and ML1 shown in FIGS. 4a and 5a or 4b and 5b, may be used for controlling an automated pipe handling apparatus (not shown) known per se. In such an embodiment, said signals ML2 and ML1 may additionally be presented visually for example as indicated by means of the target T shown in FIGS. 1-5b.

Figure 6A:
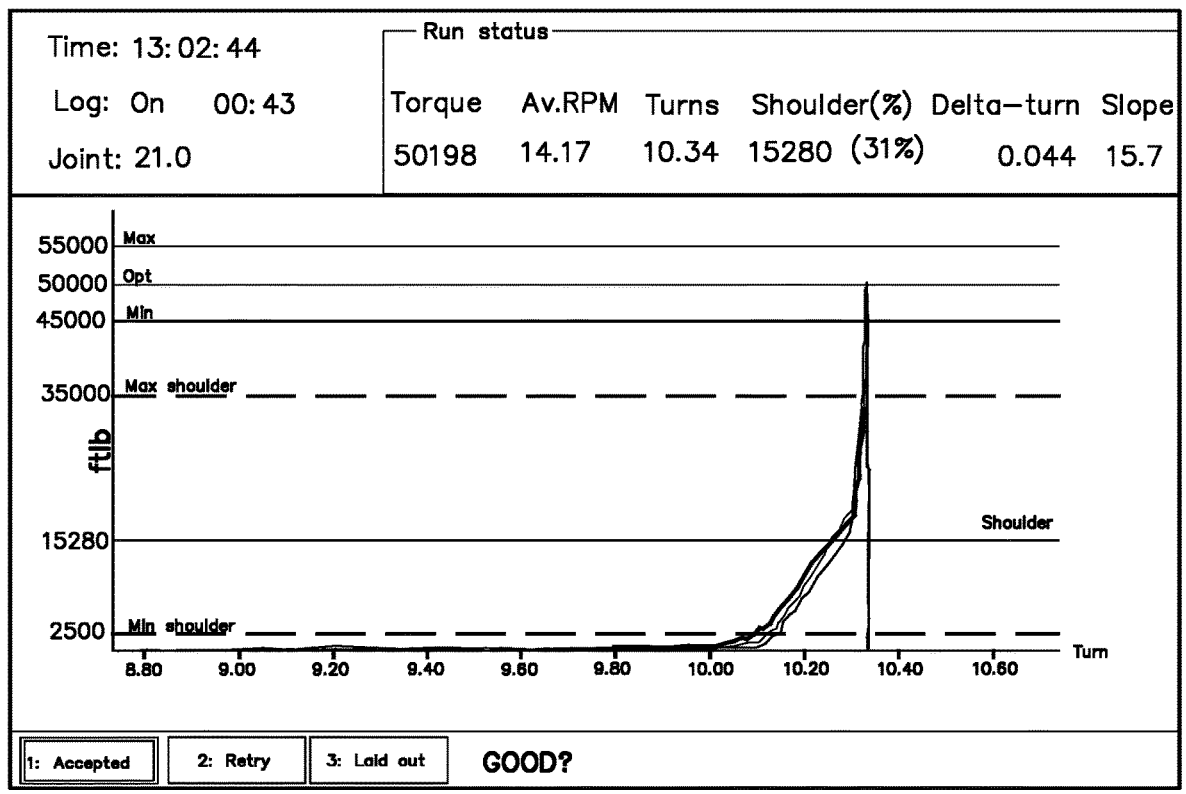
FIG. 6a shows a screen shot of an ideal make-up graph.
Figure 6B:
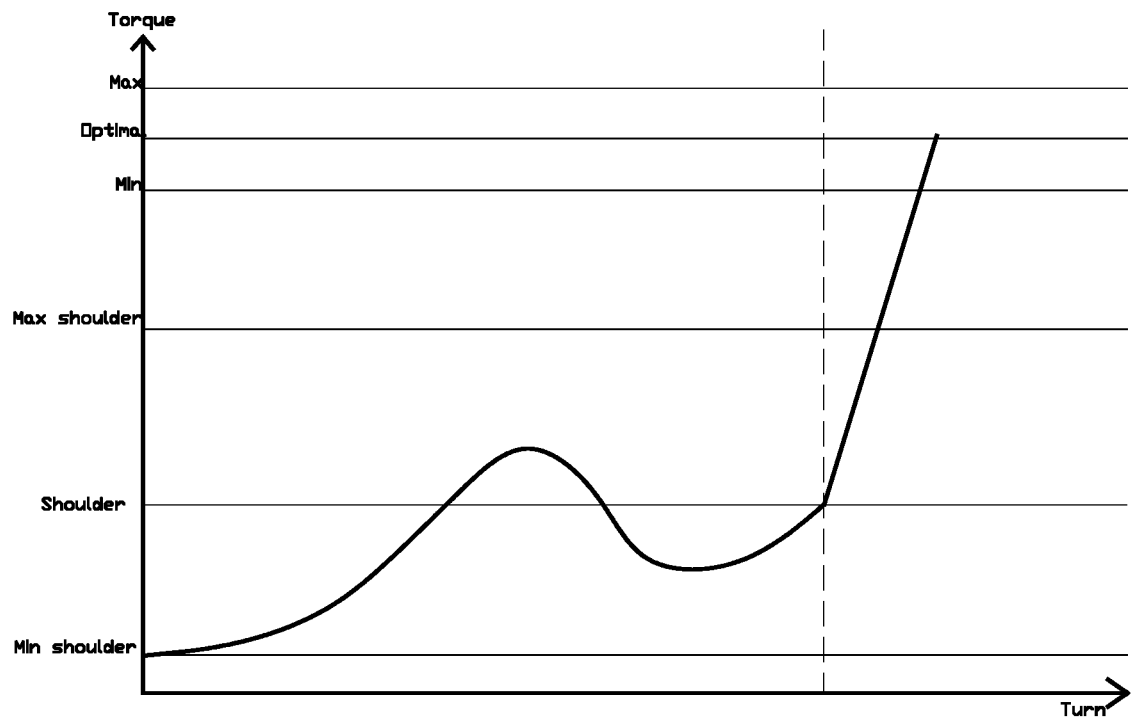
FIG. 6b shows an unacceptable make-up graph showing a so-called humping wherein a peak is above a shoulder.

Turning now to FIGS. 6a and 6b showing an ideal make-up graph and an unacceptable make-up graph, respectively.

In FIG. 6a, which shows a print out of a real measurement, the torque (vertical axis) is substantially constant until the engagement meets the so-called shoulder after a number of turns (horizontal axis). The print out shows an ideal make-up graph.

FIG. 6b illustrates a so-called "humping" which means that a so-called peak is above the shoulder. Possible causes for a humping may arise for example due to misalignment. A person skilled in the art will understand that other reasons for such a humping may be too much thread compound, bad stabbing or minor thread damage. However, the present invention concerns avoiding misalignment.

If a connection operation results in a humping, a break out of the connection is required. After the break out a cleaning and inspection of at least the threads are required. If the threads are accepted, i.e. no damage, the connection can be remade. If the threads are damaged beyond minor repair that may be performed in situ, the pipe string 9 must be pulled in order to replace the upper pipe of the pipe string 9. The pipe joint 3 must also be replaced in such a case. A person skilled in the art will know that this is a time-consuming and thus a costly operation.

In order to control the rotation R of the casing joint 3, the triangulation measurements preferably continue at least during the first few rotations R of the casing joint 3, for example during the three to five first rotations R. If the measurements reveal any misalignment between the direction vectors CL3 and CL9, the operator will halt rotation R and, based on the second signal ML1, adjust the casing joint 3 until the direction vectors CL3 and CL9 are again aligned, and then continue the rotation R. Thus, an operator may have full control of the process in order to achieve a substantial ideal make-up graph as shown in FIG. 6a. A person skilled in the art will appreciate that make-up graphs are important documentation for the making of a pipe string such as for example a casing string 9.

In a situation where misalignment of the casing joint 3 and the casing string 9 occurs after commencing the rotation R, the signal-emitting device S may be configured for issuing an alarm signal. The alarm signal may be a visual and/or an audible signal.

Turning now to FIG. 7 showing a system comprising the apparatus 1 shown in FIG. 4a wherein the first pipe 3 hangs from a pipe handling apparatus P comprising an elevator E connected to a top drive T by means of two spaced-apart bails BL (one shown) as will be appreciated by a person skilled in the art. At their end portions the bails BL are provided with eyes for connection to a connection device on the elevator E and top drive T, respectively, for providing a "hinged", i.e. freely rotating, connection. The skilled person will further understand that the pipe handling apparatus P shown in FIG. 7 is very schematic.

Each one of the two bails BL of the pipe handling apparatus P is further provided with a hydraulic cylinder HC having ends connected to a portion of the top drive T and a portion of the bail BL, respectively. The purpose of the hydraulic cylinders HC is to effect an inclination of bails BL with respect to a vertical axis as indicated by arrow A. In a neutral position the bails BL and thus the elevator E hang vertically down from the top drive T.

In the embodiment shown, the elevator E is provided with an electronic compass C. In an alternative embodiment (not shown) the electronic compass could be arranged on a rotatable portion of the top drive T, or even on one of the bails BL, However, for practical reasons, the electronic compass C should preferably be connected to the top drive T or the elevator E.

The electronic compass C is configured to indicate an imaginary plane defined by the two bails BL. The imaginary plane runs through the elevator E carried by the bails BL.

In the embodiment shown in FIG. 7, the imaginary plane defined by the two bails BL is 90° with respect to the paper plane. This means that the imaginary plane is perpendicular to the second pipe direction vector CL9. Thus, by activating the hydraulic cylinder HC, the bails BL will be inclined. In the embodiment shown, the hydraulic cylinders HC should be extended so that the elevator E urges the first pipe 3 towards left until the first pipe direction vector CL3 is coaxially with the second pipe direction vector CL9, i.e. dC=0. However, in some situations the imaginary plane defined by the bails BL, may initially be oriented with an angle being different from 90° with respect to the second pipe direction vector CL9. In such a situation, an activation of the hydraulic cylinder HC would not bring the first pipe direction vector CL3 coaxially with the second pipe direction vector CL9. Thus, it would not possible to reduce dC to zero.

The purpose of the electronic compass C is therefore to provide information to an operator (or input to the computer with software in a fully automatic version of the system) regarding the orientation of the imaginary axis with respect to the second pipe directional vector CL9. In the embodiment shown, the electronic compass E is configured for sending a signal to a transceiver 108 for receiving and transmitting signal to the monitor M. In FIG. 7 the signal ML1i indicates the signal initially received form the electronic compass E. In a semi-automatic system and based on the initial signal ML1i (here shown at "4 o'clock") the operator notes that a rotation of the top drive T is required in order to bring the imaginary axis to a predetermined position, which in the embodiment is at "3 o'clock". The operator then activates rotation of the top drive T until the signal from the electronic compass E indicates that the imaginary plane defined by the bails BL is perpendicular to the second pipe direction vector CL9, and the initial signal ML1i on the monitor M is at the predetermined position, here shown as ML1f at 3 o'clock.

From the above, the skilled person will understand that the electronic compass E issues signals "continually", for example each second. The first pipe 3 is now prepared for being axially aligned with the second pipe 9 by means of activating the hydraulic cylinder HC of the pipe handling apparatus P. In one embodiment this alignment may be achieved by controlling the hydraulic cylinders HC manually.

However, the inventor has found that the hydraulic cylinder HC may be controlled automatically by means of a hydraulic proportion valve PV operatively connected to the hydraulic cylinders HC. The hydraulic proportional valve PV is provided with a control device comprising a receiver for receiving signals from the transceiver 108 of the apparatus 1. The signals are based on data prepared by the computer 104 and software. The data are calculated from input of present position ML1f and desired position wherein ML1f is within the bull's eye B, i.e. the first pipe 3 is arranged coaxially with the second pipe 9.

The signals to the hydraulic proportional valve PV are sent "continually" during this operation, for example once per second.

When the pipes 3, 9 are aligned, the hydraulic proportional valve PV may be locked in an open position which means that the hydraulic cylinder HC is ready for a manual operation.

The method, apparatus and system according to the present invention solves the challenge of ensuring exact alignment of a first pipe 3 with respect to a second pipe 9 prior to, and in one embodiment also during, commencement of engagement of the threads 7, 13 of the pipes 3, 9, irrespective of a manual or an automatic operation. Tests show that the method considerably reduces time spent for each connection, and that damages to the threads of the pipes due to misalignment during engagement are virtually eliminated which again reduces time and costs for making a pipe string.

Further, the method and system according to one embodiment of the invention provides a near fully automatic pipe handling apparatus substantially without any modification of existing pipe handling apparatuses.

As mentioned above, the apparatus 1 according to the invention may be used as a tool for measuring the length of the pipe string while tripping in hole. This is achieved by measuring by means of is the triangulation devices (101, 102; 103) a distance between specific parts of two succeeding pipes (3, 9) and add up a total length of the pipe string run in hole.

For example, with reference to FIG. 7, after the first pipe 3 has been aligned with the second pipe 9, i.e. the first pipe direction vector CL3 has been aligned with the second pipe direction vector CL9, the detachable guiding collar 15 is removed. Thereafter, the slips 24 are released from the wedge 22 and the tripping into the hole commences. During tripping, the laser scanners 101, 102 as shown for example in FIG. 7 or the laser scanner 103 also shown in FIG. 7 and explained above in connection with FIG. 5b, are active. In FIG. 7, only the laser scanners 101, 102 are shown active, but it should be clear that the laser scanner 103 may be used as explained above in connection with FIG. 5b. The lower shoulder of the box section 11 of the second pipe 9 will be detected by the laser scanners 101, 102; or 103 because of the increased diameter with respect to the dimension of the pipe below the box section 11. A length of the first pipe 3 will be measured continually by means of the laser scanning apparatus 102; 103 until the elevator E is detected. Since the height of the elevator E is known, a lower shoulder of the first pipe 3 is also known. Thus, a length between the lower shoulders of each of the box sections of the pipes 3, 9 are known. This length is stored in the computer 104 and added up with corresponding measurements of subsequent pipes tripped in hole. Therefore, the apparatus 1 may be used for measuring an exact length of the pipe string run in hole.

The height of the elevator E is entered as input to a software of the computer.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention may be implemented by means of hardware comprising several distinct elements, and by means of a suitably programmed computer.

The invention claimed is:

1. A method for aligning a movable first pipe coaxially with a substantially stationary second pipe to prepare a threaded end portion of the first pipe for engagement with a threaded end portion of the second pipe, the method comprises the steps of:
 a) determining, via triangulation, a position of a center line of the second pipe;
 b) prior to bringing the threaded end portion of the first pipe in contact with the threaded end portion of the second pipe, determining, via triangulation, a position of a central end portion of the first pipe being closest to the second pipe;
 c) calculating direction and amount of any horizontal deviation between the center line of the second pipe and the central end portion of the first pipe facing the second pipe;
 d) outputting a course guiding signal indicative of direction and amount of the horizontal deviation calculated in step c),
 e) moving the first pipe according to the course guiding signal; and then
 f) moving the threaded end portion of the first pipe to abut against the threaded end portion of the second pipe;
wherein thereafter the method further comprises:
 g) determining a first pipe direction vector and a second pipe direction vector while the first pipe is abutting the threaded end portion of the second pipe;
 h) thereafter calculating a direction and amount of inclination of the first pipe direction vector with respect to the second pipe direction vector, said direction and amount of inclination based on a misalignment of the first pipe and second pipe;

i) thereafter outputting a fine guiding signal indicative of said direction and amount of inclination calculated in step h), wherein the fine guiding signal is separate and distinct from the course guiding signal and facilitates a comparatively finer control of the misalignment between the first pipe to thereby reduce damage to threads of the first and second pipes that otherwise would occur when the threads are engaged;

j) thereafter adjusting the inclination of the first pipe according to the fine guiding signal; and k) thereafter rotating the first pipe so that the threads of the first pipe engage with the threads of the second pipe.

2. The method according to claim 1, further comprising repeating steps g) to k) at least until a portion of the threaded end portion of the first pipe has been rotated into engagement with the threaded end portion of the second pipe.

3. The method according to claim 2, further comprising providing the course guiding signal and the fine guiding signal as visual and/or audible signals to an operator.

4. The method according to claim 2, further comprising obtaining triangulation measurements via a 3D sensor apparatus selected from a group consisting of: laser scanning apparatus, acoustic scanning apparatus, radar apparatus, stereo camera, combined with triangulation algorithms, or a combination of two or more thereof.

5. The method according to claim 2, further comprising simultaneously providing the course guiding signal and the fine guiding signal as visual signals to an operator.

6. The method according to claim 1, further comprising providing the course guiding signal and the fine guiding signal as visual and/or audible signals to an operator.

7. The method according to claim 6, further comprising obtaining triangulation measurements via a 3D sensor apparatus selected from a group consisting of: laser scanning apparatus, acoustic scanning apparatus, radar apparatus, stereo camera, combined with triangulation algorithms, or a combination of two or more thereof.

8. The method according to claim 1, further comprising providing the course guiding signal and the fine guiding signal as input signals for controlling an automatic pipe handling apparatus.

9. The method according to claim 8, further comprising obtaining triangulation measurements via a 3D sensor apparatus selected from a group consisting of: laser scanning apparatus, acoustic scanning apparatus, radar apparatus, stereo camera, combined with triangulation algorithms, or a combination of two or more thereof.

10. The method according to claim 1, further comprising:
prior to step j) determining via a signal from an electronic compass an orientation of an elevator carrying the first pipe, the elevator connected to a top drive via bails, each bail operatively connected to a hydraulic cylinder for adjusting an inclination of the bails;
comparing a current orientation with a desired orientation required for adjusting the inclination of the first pipe; and
if the desired orientation deviates from the current orientation, activating a rotation of the top drive so that the desired orientation is achieved.

11. The method according to claim 10, wherein step j) of adjusting the inclination of the first pipe according to the fine guiding signal comprises activating the hydraulic cylinder via a proportional hydraulic valve configured for receiving a control signal.

12. The method according to claim 11, wherein the control signal is computer generated.

13. The method according to claim 1, further comprising obtaining triangulation measurements via a 3D sensor apparatus selected from a group consisting of: laser scanning apparatus, acoustic scanning apparatus, radar apparatus, stereo camera, combined with triangulation algorithms, or a combination of two or more thereof.

14. The method according to claim 1, further comprising measuring a length of a pipe string via triangulation while being tripped in hole.

15. An apparatus for aligning a movable first pipe coaxially with a substantially stationary second pipe to prepare a threaded end portion of the first pipe for engagement with a threaded end portion of the second pipe, the apparatus comprising:
a. a first triangulation device for determining a position of a center line of the second pipe, the first triangulation device configured for sending a signal to a computer;
b. a second triangulation device for determining a position of a central end portion of the first pipe being closest to the second pipe, the second triangulation device configured for sending a signal to the computer;
c. the computer configured for calculating direction and amount of any horizontal deviation between the center line of the second pipe and the central end portion of the first pipe facing the second pipe;
d. a signal transmitter for outputting a course guiding signal indicative of direction and amount of the horizontal deviation calculated by the computer; wherein the computer is further configured for thereafter calculating a first pipe direction vector and a second pipe direction vector after the threaded end portion of the first pipe has been moved to abut against the threaded end portion of the second and thereafter providing a signal to the signal transmitter for outputting a fine guiding signal indicative of a direction and amount of inclination calculated by the computer while the first pipe is abutting the threaded end portion of the second pipe, said direction and amount of inclination based on a misalignment of the first pipe and second pipe;
e. wherein the fine guiding signal is separate and distinct from the course guiding signal and facilitates a comparatively finer control of the misalignment between the first pipe to thereby reduce damage to threads of the first and second pipes that otherwise would occur when the threads are engaged.

16. The apparatus according to claim 15, further comprising a display that simultaneously provides the course guiding signal and fine guiding signal as visual signals to an operator.

17. A system for aligning a movable first pipe coaxially with a substantially stationary second pipe to prepare a threaded end portion of the first pipe for engagement with a threaded end portion of the second pipe, the apparatus comprising:
f. a first triangulation device for determining a position of a center line of the second pipe, the first triangulation device configured for sending a signal to a computer;
g. a second triangulation device for determining a position of a central end portion of the first pipe being closest to the second pipe, the second triangulation device configured for sending a signal to the computer;

h. the computer configured for calculating direction and amount of any horizontal deviation between the center line of the second pipe and the central end portion of the first pipe facing the second pipe;

i. a signal transmitter for outputting a first guiding signal indicative of direction and amount of the horizontal deviation calculated by the computer; wherein the computer is further configured for calculating a first pipe direction vector and a second pipe direction vector and providing a signal to the signal transmitter for outputting a second guiding signal indicative of direction and amount of inclination calculated by the computer, wherein the system comprises an electronic compass arranged on a pipe handling apparatus comprising an elevator and bails connecting the elevator to a top drive, wherein the compass is configured for sending a signal indicative of a position of an imaginary plane defined by a centerline of the bails.

18. The system according to claim 17, further comprising a hydraulic proportional valve configured for activating hydraulic cylinders for affecting an inclination of the bails with respect to a vertical axis.

19. The system according to claim 18, wherein the hydraulic proportional valve is operated via signals generated by the computer of the apparatus, the signals being based on the fine guiding signal being indicative of direction and amount of inclination of the first pipe direction vector with respect to the second pipe direction vector.

* * * * *